US009549217B2

United States Patent
Eaton (10) Patent No.: US 9,549,217 B2
(45) Date of Patent: Jan. 17, 2017

(54) NOTIFICATION CONTROLS FOR TELEVISION VIEWING

(71) Applicant: ECHOSTAR TECHNOLOGIES LLC, Englewood, CO (US)

(72) Inventor: Zane Eaton, Kharkiv (UA)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 24 days.

(21) Appl. No.: 14/428,933

(22) PCT Filed: Sep. 17, 2012

(86) PCT No.: PCT/UA2012/000085
§ 371 (c)(1),
(2) Date: Mar. 17, 2015

(87) PCT Pub. No.: WO2014/042607
PCT Pub. Date: Mar. 20, 2014

(65) Prior Publication Data
US 2015/0256884 A1    Sep. 10, 2015

(51) Int. Cl.
*H04N 5/445* (2011.01)
*H04N 21/466* (2011.01)
(Continued)

(52) U.S. Cl.
CPC .... *H04N 21/4667* (2013.01); *H04N 21/25875* (2013.01); *H04N 21/44222* (2013.01);
(Continued)

(58) Field of Classification Search
CPC ...................... H04N 21/4667; H04N 21/44222; H04N 21/4751; H04N 21/25875
(Continued)

(56) References Cited

U.S. PATENT DOCUMENTS 6,144,401 A    11/2000    Casement et al.
7,161,483 B2 *  1/2007    Chung ................ H04L 12/2803
                                                    340/12.53
(Continued)

FOREIGN PATENT DOCUMENTS

WO    2008086117 A2    7/2008
WO    2010019095 A1    2/2010

OTHER PUBLICATIONS

International Search Report as received in PCT/UA2012/000085 mailed May 27, 2013, 4 pages.
(Continued)

*Primary Examiner* — Pankaj Kumar
*Assistant Examiner* — Sahar Baig
(74) *Attorney, Agent, or Firm* — Kilpatrick Townsend & Stockton LLP (57) ABSTRACT

Notification controls regarding television viewing are disclosed. According to certain embodiments, a notification condition can be created and by one or more components of a notification system. Actions regarding viewing of television content are then monitored and compared with the notification condition. Once the notification condition is satisfied, a notification is sent, which can be in real time or near-real time, as the television is being watched. Notification conditions may be satisfied with any of a variety of triggers, and the notifications can be sent in a variety of forms to any of a variety of devices. The notification system can redirect a television to a predetermined television channel and/or request authorization to access certain content. Notification controls can be created, viewed, and/or managed using any of a variety of devices.

20 Claims, 8 Drawing Sheets

(51) Int. Cl.
*H04N 21/258* (2011.01)
*H04N 21/475* (2011.01)
*H04N 21/6334* (2011.01)
*H04N 21/442* (2011.01)

(52) U.S. Cl.
CPC ..... *H04N 21/4751* (2013.01); *H04N 21/4753* (2013.01); *H04N 21/6334* (2013.01)

(58) Field of Classification Search
USPC ...................................................... 725/40, 44
See application file for complete search history.

(56) References Cited

U.S. PATENT DOCUMENTS

| | | | | |
|---|---|---|---|---|
| 8,489,065 | B2* | 7/2013 | Green | G08B 13/19689 348/143 |
| 2003/0200217 | A1* | 10/2003 | Ackerman | G06F 21/32 |
| 2004/0010798 | A1 | 1/2004 | Galli et al. | |
| 2006/0173782 | A1* | 8/2006 | Gargi | G06F 21/10 705/51 |
| 2008/0172689 | A1* | 7/2008 | Feder | G06Q 30/02 725/28 |
| 2008/0222734 | A1* | 9/2008 | Redlich | G06F 21/577 726/26 |
| 2009/0089882 | A1* | 4/2009 | Hofmann | H04N 7/163 726/28 |
| 2009/0328087 | A1* | 12/2009 | Higgins | H04N 7/173 725/10 |
| 2010/0192205 | A1* | 7/2010 | Chaudhry | G06F 21/31 726/5 |
| 2010/0239227 | A1* | 9/2010 | Bhogal | H04N 5/76 386/291 |
| 2011/0067063 | A1* | 3/2011 | Karaoguz | G06F 3/0304 725/40 |
| 2012/0117585 | A1* | 5/2012 | Curtis | G11B 20/10527 725/25 |
| 2014/0162598 | A1* | 6/2014 | Villa-Real | H04M 1/66 455/411 |

OTHER PUBLICATIONS

International Preliminary Report on Patentability for PCT/UA2012/000085 issued Mar. 17, 2015, all pages.

\* cited by examiner

NOTIFICATION CONTROLS FOR TELEVISION VIEWING

CROSS-REFERENCE TO RELATED APPLICATION

This application is a 35 U.S.C. §371 U.S. National Stage Entry of PCT/UA2012/000085, filed 17 Sep. 2012, which is hereby incorporated by reference in its entirety.

BACKGROUND

Parental controls of modern televisions and/or television receivers enable consumers to restrict what is viewed on a television, often requiring a password to be entered to view restricted television programming. However, password protection and similar techniques can be hacked and/or otherwise bypassed, and provide little or no information to a consumer regarding what restricted programming is accessed or if any attempts were made to access restricted programming. Moreover, creating and managing parental controls are often confined to the television on which the parental controls are to be implemented.

SUMMARY

Techniques are disclosed for providing notification controls regarding television viewing. According to certain embodiments, a notification condition can be created and by one or more components of a notification system. Actions regarding viewing of television content are then monitored and compared with the notification condition. Once the notification condition is satisfied, a notification is sent, which can be in real time or near-real time, as the television is being watched. Notification conditions may be satisfied with any of a variety of triggers, and the notifications can be sent in a variety of forms to any of a variety of devices. The notification system can redirect a television to a predetermined television channel and/or request authorization to access certain content. Notification controls can be created, viewed, and/or managed using any of a variety of devices.

According to one embodiment, a method for providing notification controls of video content can include creating a notification condition based on user input where the notification condition relates to viewing of video content, storing the notification condition in a database, and monitoring actions regarding viewing of video content on at least one presentation device. The method can further include comparing, with a processing unit, the actions with the notification condition to determine whether the notification condition has been satisfied, and causing a notification to be created, based on satisfaction of the notification condition.

The embodiment of the method for providing notification controls of video content can also include one or more of the following features. The notification can include at least one of a log entry, a short message service (SMS) message, an email, or an on-screen message. Causing the at least one presentation device to be redirected to a certain television channel, based on the satisfaction of the notification condition. Satisfaction of the notification condition can be based on at least one of entering a password, entry of a threshold number of password attempts, viewing of certain video content, attempted viewing of certain video content, viewing of a certain television channel, attempted viewing of certain television channel, searching for certain video content, viewing of a threshold amount of video content for a given period of time, or viewing video content, or a certain television channel, during a certain period of time. The actions can include an attempt to access certain video content, and the method can also include receiving, in response to the notification, an authorization command, and allowing the certain video content to be viewed, based on the authorization command. The authorization command can include an SMS message. A user interface can be provided for creation of the notification condition. The user interface comprises at least one of an interface displayed on the at least one presentation device, a web page, or an application executed by a computing device. The database can be stored on a computer-readable storage medium at a location remote from the at least one presentation device.

According to another embodiment, an apparatus for providing notification controls of video content can include at least one television tuner configured to receive at least one channel of television programming, a communication interface configured to communicate data via a communication network, and a processing unit communicatively coupled with the at least one television tuner and the communication interface. The apparatus can also include a memory communicatively coupled with and readable by the processing unit and having stored therein computer-readable instructions. The instructions, when executed by the processing unit, can cause the processing unit to receive a notification condition relating to video content, monitor actions regarding viewing of television content on at least one television, compare the actions with the notification condition to determine whether the notification condition has been satisfied, cause a notification to be created, based on satisfaction of the notification condition, and provide the notification to a user.

The apparatus for providing notification controls of video content also can include one or more of the following features. Satisfaction of the notification condition can be based on at least one of, entering a password, entry of a threshold number of password attempts, viewing of certain video content, attempted viewing of certain video content, viewing of a certain video content, attempted viewing of certain video content, searching for certain video content, viewing of a threshold amount of television content for a given period of time, or viewing video content, or a certain television channel, during a certain period of time. The memory can be configured to store the notification condition in a database. The computer-readable instructions, when executed by the processing unit, can further cause the processing unit to communicate the notification condition to a remote device, receive the notification condition via the communication interface, and/or tune the at least one television tuner to a certain television channel, based on the satisfaction of the notification condition. If the actions comprise an attempt to access certain video content, the computer-readable instructions, when executed by the processing unit, can further cause the processing unit to receive, in response to the notification, an authorization command, and allow the certain video content to be viewed, based on the authorization command. If the actions comprise an attempt to access certain video content, the computer-readable instructions, when executed by the processing unit, further cause the processing unit to provide a user interface for creation of the notification condition.

According to yet another embodiment, a computer program product residing on a non-transitory machine-readable storage medium for providing notification controls of video content can include processor-readable instructions configured to cause a processing unit to receive a notification condition relating to video content based on user input, monitor actions regarding viewing of video content on at least one presentation device, compare the actions with the notification condition to determine whether the notification condition has been satisfied, cause a notification to be created, based on satisfaction of the notification condition, and provide the notification to a user.

The computer program product for providing notification controls of video content also can include one or more of the following features. The processor-readable instructions can be further configured to cause the processing unit to redirect the at least one presentation device to a certain television channel, based on the satisfaction of the notification condition. If the actions comprise an attempt to access certain video content, the processor-readable instructions can be further configured to cause the processing unit to receive, in response to the notification, an authorization command, and allow the certain video content to be viewed, based on the authorization command. The processor-readable instructions can be further configured to cause the processing unit to provide a user interface for creation of the notification condition.

Numerous benefits are achieved over conventional techniques. For example, notification controls can be created, viewed, and/or managed by any of a variety of devices. Notifications can be provided in a variety of forms to any of a variety of devices, and may further allow for authorization to access certain television content. This provides functionality and interaction far beyond traditional password-based parental control systems. Additionally, notification controls can be applied to multiple televisions. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Parental controls of modern televisions and/or television receivers enable consumers to restrict what is viewed on a television, often requiring a password to be entered to view restricted television programming. However, password protection and similar techniques can be hacked and/or otherwise bypassed, and provide no information to a consumer regarding what restricted programming is accessed or if any attempts were made to access restricted programming. Moreover, these controls typically operate passively, with no ability to allow authorization to view certain material, if desired. Ultimately, traditional parental controls are quite limited in functionality.

Embodiments disclosed herein are directed toward providing notification controls that extend far beyond traditional parental controls. The techniques disclosed herein enable devices networked to a television to provide notifications and other alerts based on any of a variety of triggering events that may satisfy a notification condition. Such notification conditions can relate to content viewed—or attempted to be viewed—on a television. Notifications, including authorization requests, may be sent via the Internet, a local network, a mobile data carrier network, and the like, and may be set up using any of a variety of computing devices, such as mobile phones, personal computers, set-top boxes (and/or other receiving hardware), tablet computers, and the like.

It should be understood that while the embodiments detailed herein disclose providing notifications regarding television programming viewed on a television, notifications can be extended to video content other than television programming and/or presentation devices other than televisions (e.g., computer monitors, mobile phones, media players, gaming systems, tablet computers, etc.).

Figure 1:
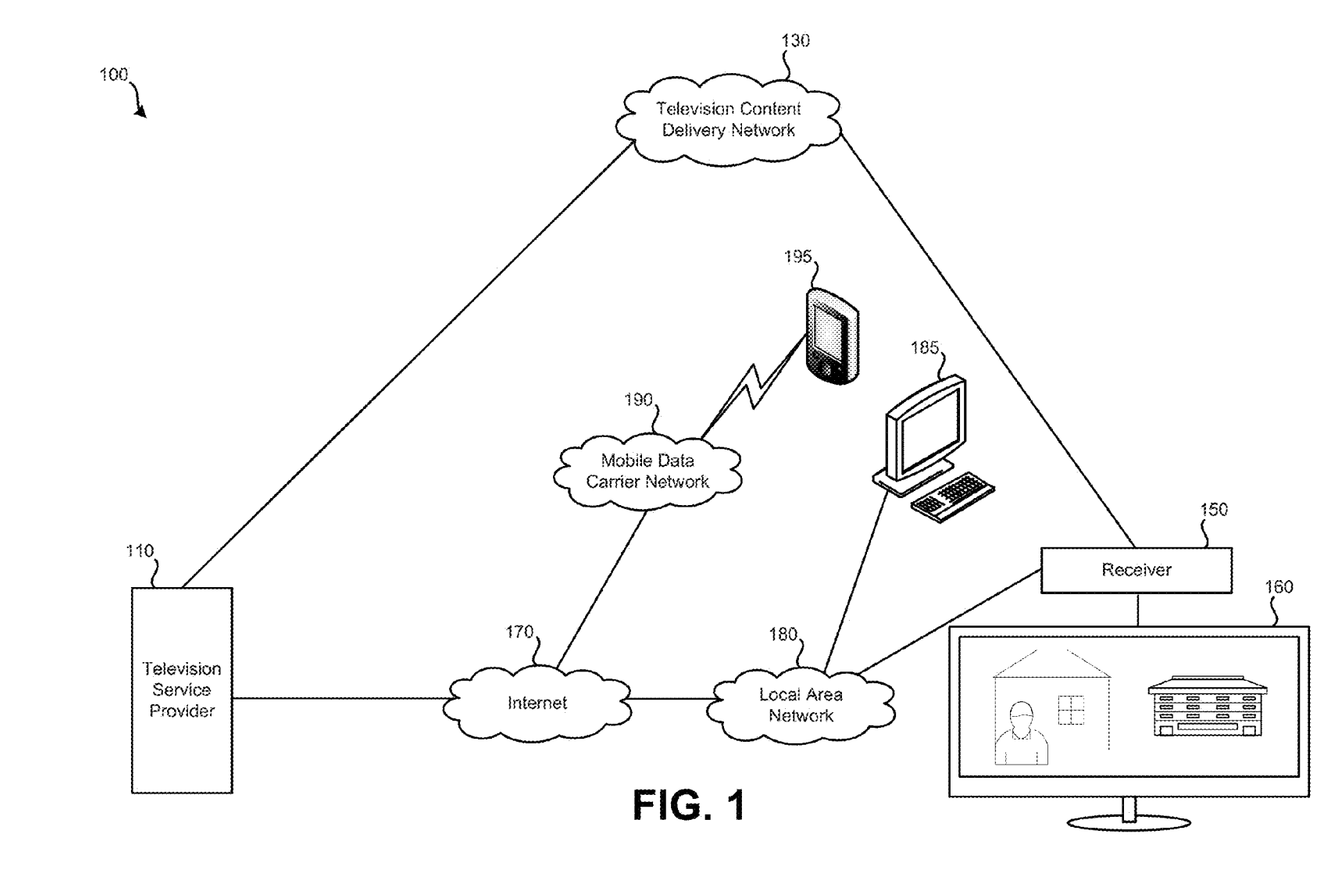
FIG. 1 illustrates an embodiment of a notification system.

FIG. 1 illustrates an embodiment of a notification system 100. The notification system 100 can include: a television service provider 110, television content delivery network 130, receiver 150, television 160, Internet 170, Local Area Network (LAN) 180, computing device 185, mobile data carrier network 190, and mobile device 195. Alternate embodiments of notification system 100 may include fewer or greater numbers of components. While only one receiver 150, television 160, computing device 185, and mobile device 195 (collectively referred to as "user equipment") are illustrated, it should be understood that multiple (tens, thousands, millions, etc.) instances of user equipment may receive television signals from television content delivery network 130.

The television content delivery network 130 may be operated, in whole or in part, by the television service provider 110, which may provide feeds of one or more television channels to the television content delivery network 130. Such television channels may include multiple television channels that contain the same content (but may be in different formats, such as high-definition and standard-definition). To distribute such television channels to users, the television content delivery network 130 may employ any of a variety of data communication technologies, such as radio frequency (RF), satellite, optical, cable, and the like. Moreover (although not shown in FIG. 1), the television content delivery network 130 may further include transmitting data over other communication networks, such as the Internet 170, private, public, local, and/or wide-area networks. While a television service provider 110 is illustrated as part of the notification system 100, it should be understood that multiple television service providers 110 may be present, possibly scattered geographically.

Figure 2:
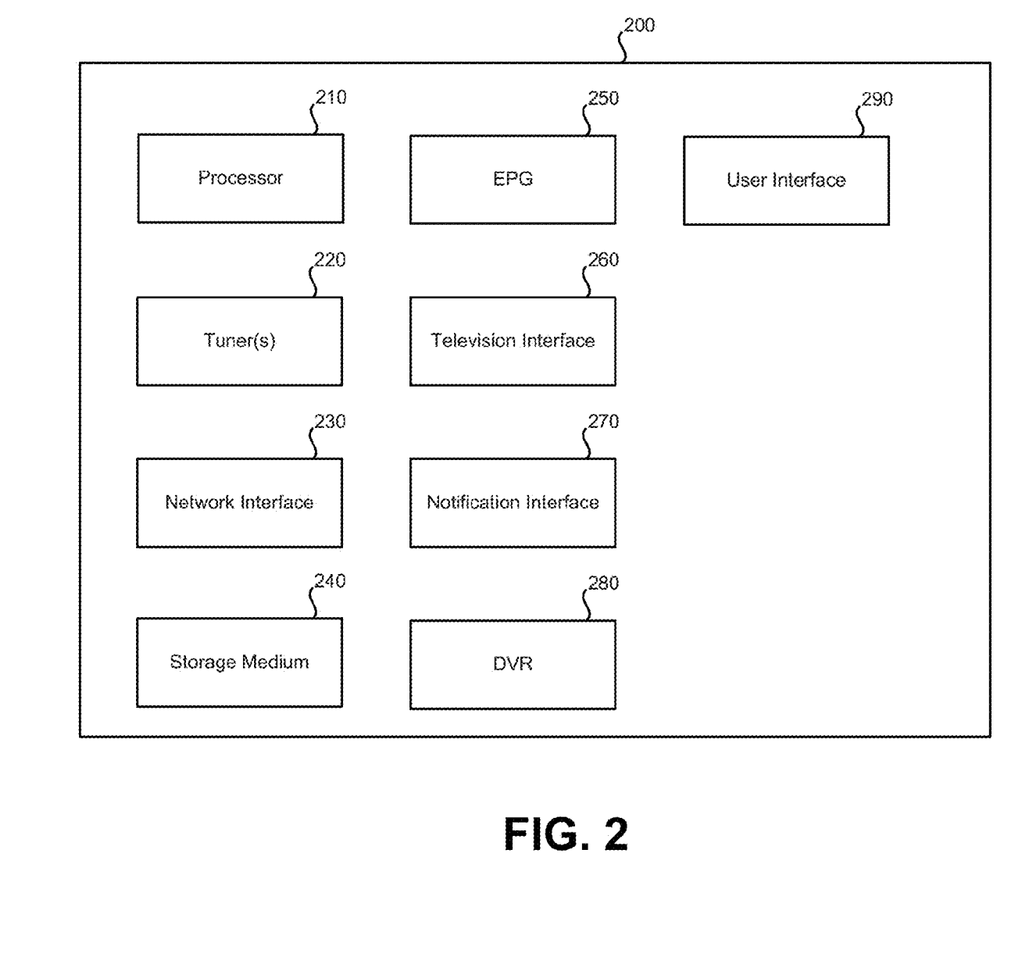
FIG. 2 illustrates a block diagram of an embodiment of receiving equipment.

The receiver 150 may be a piece of user equipment that is used to receive signals from the television content delivery network 130. The receiver 150 may be provided to a user for use on a subscription basis to receive television channels provided by the television service provider 110 and/or television content delivery network 130. The receiver 150 may be configured to decode television channels on multiple frequencies and provide them for display on a display device, such as television 160. Furthermore, the receiver 150 may be incorporated as part of a television or may be part of a separate device, commonly referred to as a set-top box (STB). FIG. 2 provides additional detail of receiving equipment, which can include receiver 150.

The television 160 may be used to present video and/or audio decoded by the receiver 150. The receiver 150 may also output a display of one or more interfaces to the television 160, such as an electronic programming guide (EPG). In some embodiments, a display device other than a television may be used.

In some embodiments, such as the embodiment shown in FIG. 1, components of the notification system 100 can be connected to the Internet 170. For a computing device (e.g., a PC, notebook, tablet, media player, video game console, and the like), Internet connectivity may be provided via a LAN 180. For a mobile device 195, Internet connectivity may be provided by a mobile data carrier network 190. Other embodiments and/or configurations may enable these components to connect to the Internet using other methods. Additionally or alternatively, communication networks other than the Internet may be used. A person of ordinary skill in the art will recognize many alterations, additions, and/or modifications to the embodiment shown in FIG. 1.

Notification conditions (i.e., conditions in which notifications are to be created; also referred to as notification "rules") regarding content viewed by the television 160 can be created, managed, and/or stored locally by the receiver 150 and/or remotely by, for example, the television service provider 110. One or more monitoring device(s), such as the receiver 150 and/or television service provider 110, can monitor actions on television 160 related to television viewing, and compare the actions to the notification conditions. When a notification condition is determined to have been satisfied, the monitoring device(s) can cause a corresponding notification to be created.

Different notification types may require different processes to create them. For example, a log may simply require the creation of a log entry (e.g., date, time, channel, content, action(s), etc.) and storage (e.g., on a local memory) and/or transmittal (e.g., to a remote database and/or other remote device) of the log entry. The creation of a short message service (SMS) message or email may require the monitoring device(s) to communicate notification information (e.g., a message, related data, etc.) to a server that can send the SMS message and/or email to a corresponding computing device (e.g., smart phone, personal computer, etc.).

In some embodiments, the monitoring device(s) can display a notification message on a television. For example, if television viewing on a first television satisfies a notification condition, and if the monitoring device(s) determine that a second television is currently being watched, the monitoring device(s) may display the notification on the second television. Additionally or alternatively, the monitoring device(s) can send the notification through a default method, such as via email and/or SMS message. More details regarding notification types and conditions are provided below.

FIG. 2 illustrates a block diagram of an embodiment of receiving equipment 200. Receiving equipment 200 may be a receiver, such as receiver 150 of FIG. 1, and/or may be part of a television, such as television 160 of FIG. 1. Receiving equipment 200 may include: a processor 210, tuner 220, network interface 230, storage medium 240, electronic programming guide (EPG) 250, television interface 260, notification interface 270, digital video recorder (DVR) 280, and/or user interface 290. In other embodiments of receiving equipment 200, fewer or greater numbers of components may be present. It will be understood that components can comprise hardware and/or software, thereby being virtual and/or physical. A person of ordinary skill in the art will recognized many omissions, additions, and/or other modifications.

Processor 210 may be a general-purpose processor configured to perform processes such as decoding a video signal from a particular format, such as MPEG, for output and display on a television. Tuner(s) 220 may include one or more tuners used to tune to television channels, such as television channels transmitted via a television content delivery network to receiving equipment 200.

Network interface 230 may be used to enable the receiving equipment 200 to connect communicate with other systems, such as the television service provider 110, mobile device 195, and computing device 185, as well as receiving equipment 200 associated with other televisions. Information may be transmitted and/or received via network interface 230 via a LAN, the Internet, and/or other networks.

The storage medium 240 may represent a non-transitory computer readable storage medium. The storage medium 240 may include memory and/or a hard drive. The storage medium 240 may be used to store information received from one or more television content delivery network(s) and/or information received via network interface 230. The storage medium 240 may store information related to EPG 250 and/or notification interface 270.

The EPG 250 may store information related to television channels and the timing of programs appearing on such television channels. Information used to populate EPG 250 may be received via network interface 230 and/or via a television content delivery network, such as the television content delivery network 130 of FIG. 1. Information stored by the EPG can include title, content, rating, and schedule of television programming, among other things. Such information also can be utilized by the notification interface 270, as discussed in more detail below.

The television interface 260 may serve to output a signal to a television in a proper format for display of video and playback of audio.

The notification interface 270 may be used to create, manage, and/or store notifications and/or notification settings, collect information regarding notifications, create a notification log, and/or supply notification information to networked components via the network interface 230. The notification interface 270 can include, for example, an application with which notifications are created and managed via the television to which the receiving equipment 200 is connected. In some embodiments, the notification interface 270 can include a client application communicatively connected with a server application running on a remote system (e.g., different receiving equipment 200, a server of the television service provider 110, etc.). In such embodiments, notification information may be stored and/or managed, in part or in whole, by the remote system.

The Digital Video Recorder (DVR) 280 may permit a television channel to be recorded. The DVR 280 may be configured by a user to record particular television programs. Some embodiments may enable users to record content on the DVR as part of a notification. For example, an entry in a notification log may include a link by which a viewer of the notification log can access recorded television programming associated with the log entry.

The user interface 290 may include a remote control that allows a user to interact with receiving equipment 200. User interface 290 may be used to select a television channel for viewing, view EPG 250, and/or program DVR 280.

Figure 3:
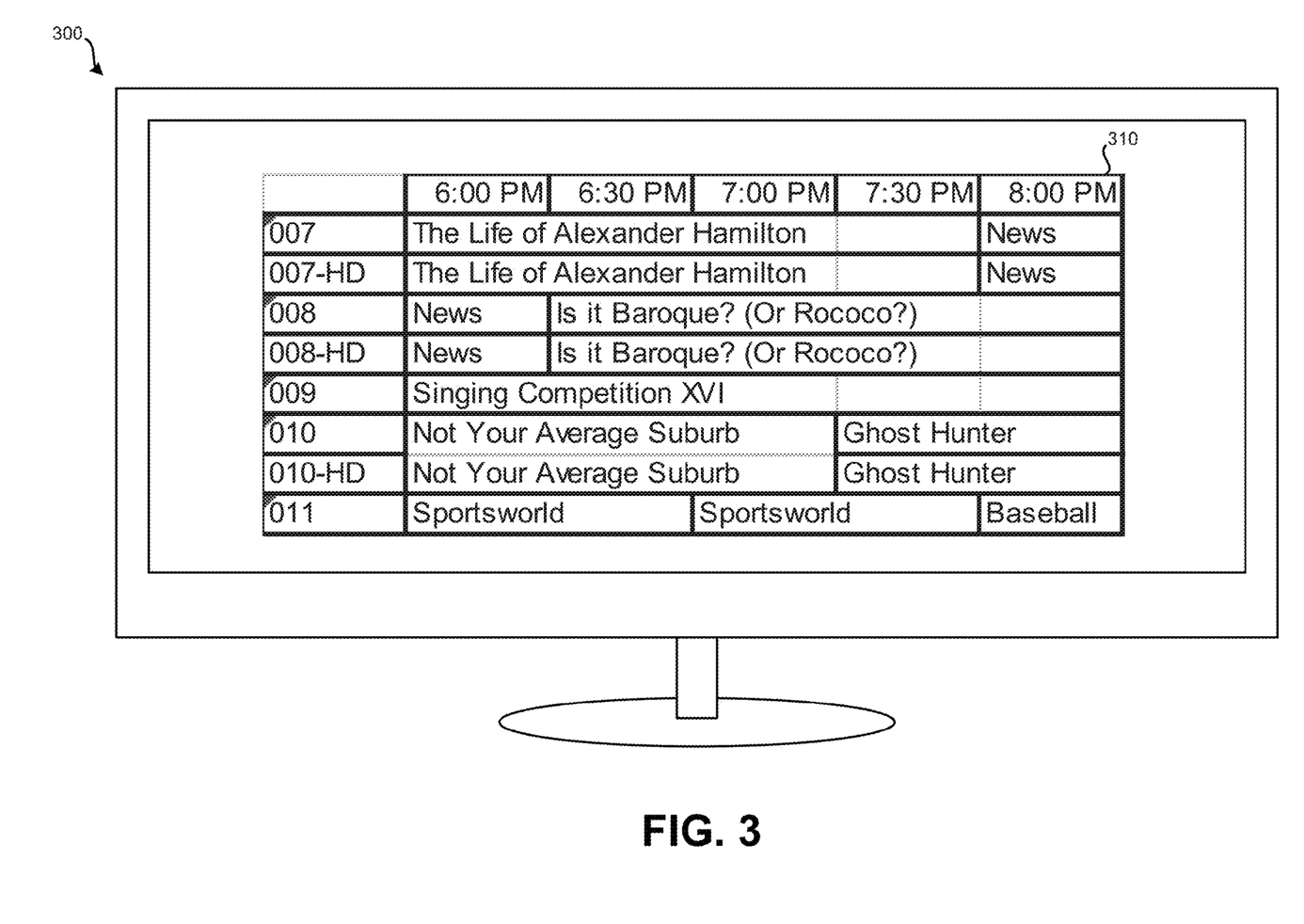
FIG. 3 illustrates an embodiment of an Electronic Programming Guide (EPG) displayed by a television.

FIG. 3 illustrates an embodiment 300 of an Electronic Programming Guide (EPG) 310 displayed by a television, wherein available television programming is displayed. The television of embodiment 300 may represent television 160 of FIG. 1 EPG 310 may represent an embodiment of EPG 250 of receiving equipment 200.

EPG 310 may be customized, and may be display only a limited set of available television programming, depending on notification, parental, and/or other controls. In some embodiments, for example, may allow the EPG 310 be customized to omit certain channels and/or content. Such customization may also be time based (e.g., omit content of specified channels after 10:00 PM). Additionally or alternatively, the EPG 310 may limit searches to certain content (e.g., content that has not been omitted due to notification, parental, and/or other controls).

Figure 4A:
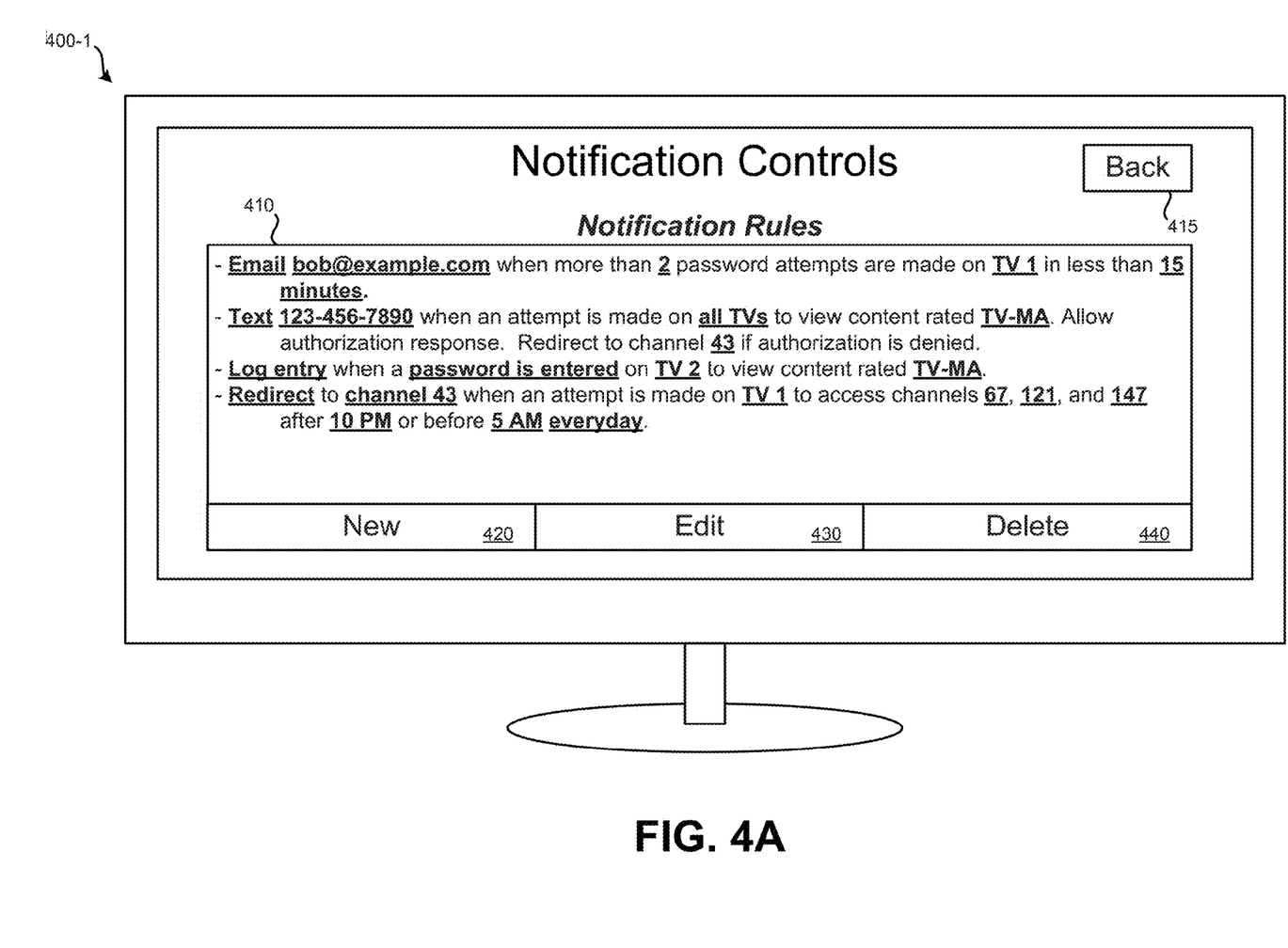
FIGS. 4A and 4B illustrate a basic user interface by which notification controls can be created, edited, and/or managed, according to some embodiments.
Figure 4B:
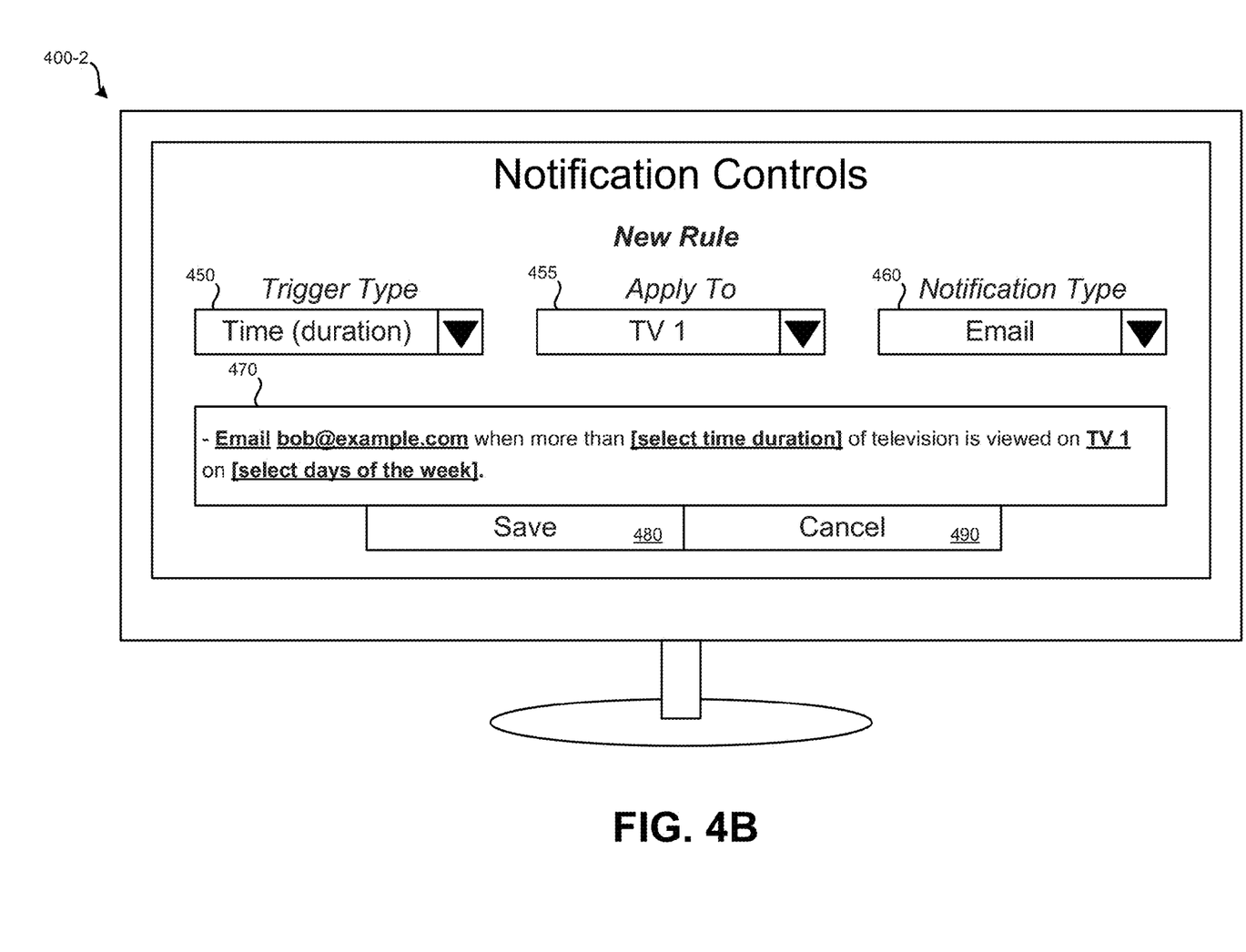

FIGS. 4A and 4B illustrate a basic user interface 400 by which notification controls can be created, edited, and/or managed, according to some embodiments. The user interface 400 of FIGS. 4A and 4B is a non-limiting example, showing basic functionality of a contemplated notification control user interface 400, as part of an EPG, according to some embodiments. A password may be required to access the user interface 400 and/or otherwise view, edit, and/or access notification conditions. A person having ordinary skill in the art will recognize many additions, omissions, and/or other modifications.

Although the user interface 400 provided in FIGS. 4A and 4B is shown on a television display, the user interface 400, or other user interfaces with similar functionality, can be provided on any of a variety of computing devices. For example, a similar user interface may be provided as a web page, accessible to a user via a range of Internet-connected device. Additionally or alternatively, a user interface may be provided by an application executed by a computing device (e.g., personal computer, mobile device, etc.). A user may provide input to the user interface 400 using a remote control, touchscreen, mouse, and/or other input device, depending on the device with which the user interface 400 is displayed. Any additions, deletions, and/or other changes to notification conditions can be communicated to a receiver 150 and/or television service provider 110, which can store and/or implement the changes.

FIG. 4A illustrates a first user interface 400-1 by which a user may view, create, edit, and/or delete notification conditions, according to one embodiment. The first user interface 400-1 can include a listing of existing notification conditions 410, as well as "New" 420, "Edit" 430, and "Delete" buttons for creating, modifying, and removing notification conditions, respectively. In the embodiment shown, the first user interface 400-1 can be implemented as a menu option and/or other setting of an EPG. As such, the first user interface 400-1 can include a back button 415 by which the user may return to a previous screen (e.g, a previous screen of the EPG, television programming, etc.).

The listing of existing notification conditions 410 can vary, depending on desired functionality, user-friendliness concerns, and/or other factors. In the embodiment shown in FIG. 4A, the listing of existing notification conditions 410 shows notification conditions offset with bullet points. Configurable aspects of the notification conditions, such as notification type, email, text, channel, television, time, etc. are bolded and underlined, highlighting the key aspects of each notification condition and indicating that these aspects can be edited.

The listing of existing notification conditions 410 may be modified using any of the buttons 420, 430, and 440 at the bottom of the notification screen. The "Edit" 430 and "Delete" 440 buttons can allow a user to modify or remove one or more selected notification conditions, respectively. The "New" button 420 can enable a user to create a new notification condition. Depending on desired functionality, the selection of any of these buttons 420, 430, and 440 may cause a new screen (e.g., user interface) to be shown.

FIG. 4B illustrates a second user interface 400-2 by which a user may create a new notification condition. The second user interface 400-2 can be invoked, for example, when the "New" button 420 of the first user interface 400-1 is selected.

The second user interface 400-2 can include a variety of drop-down boxes, radio buttons, and/or other controls to facilitate the creation of a new notification condition. In the embodiment shown in FIG. 4B, for example, different drop-down boxes are provided to allow a user to select a trigger type 450, device 455, and notification type 460. Additional windows, screens, or other user interfaces may be utilized to allow for further customization. The notification condition, in its current form, can be displayed in a display box 470, and the user may save the notification condition or cancel the process by selecting either of the respective "Save" 480 or "Cancel" 490 buttons.

Depending on desired functionality, the trigger type 450 can include any of a variety of actions that would satisfy the notification rule. Such actions can include viewing a certain television channel and/or viewing certain content. When this option is selected, for example, the second user interface 400-2 can provide an additional window enabling a user to identify one or more channels that, when viewed, satisfy a notification condition. Additionally or alternatively specific content can be identified, such as content having certain characteristics (e.g., sex, nudity, violence, etc.), content at or above a certain threshold rating (e.g., TV-PG, TV-14, etc.), and more, if such information is available. Other content-based triggers can include searches for certain content (e.g., sex, nudity, violence, etc.) and/or having certain search words.

Additionally or alternatively, a password may be set in place such that a user must input a password to access such channels and/or content. As such, the entry of a password to access such channels and/or content may be selected as a trigger type 450. Optionally, the entry of an incorrect password may also be a trigger type. In this case, the trigger type can be set up such that the notification condition is satisfied if a certain number of password attempts are made within a specified amount of time.

Other trigger types can be time based. For example, the trigger type 450 drop down box may allow a user to create a notification condition based on viewing television during an identified time period (e.g., after 10 PM or before 5 AM). This can be based on viewing one or more predetermined channels and/or any television programming at all. Time-based notification conditions may also include watching more than a threshold amount of television within a certain amount of time. For example, a notification condition can be based on watching more than 2 hours of television in a given 24-hour period, or watching more than 3.5 hours on a Saturday. Again, this notification condition can be based on watching certain channels or content, and/or any television programming at all.

Depending on desired functionality, particular configurations, and/or other concerns, notification conditions can be applied to particular devices (e.g., one or more specified televisions). The user can select the device(s) using the device drop-down box 455.

The notification type can be selected using the notification type drop box 460. Notification types can vary, depending on desired functionality, Internet connectivity, user devices, and other factors. Notification types can include log entries, email message, SMS messages, automated telephone calls, on-screen notifications, and the like. Depending on the notification type selected, a user may be prompted to enter contact information (e.g., an email address, phone number, etc.), and/or select contact information from a list of previously-entered information. Some embodiments may allow multiple notification types to be selected for a particular notification condition.

It will be understood that other controls not shown in FIG. 4B may be used to allow for a different user experience and/or provide different functionality. For example, some controls may enable access to certain channels and/or content to be provided upon authorization. Where notifications can be provided via SMS message, email, TV, etc., an authorization command may be provided in a response. For example, if a notification condition provides for an SMS message is sent when certain content is attempted to be viewed on a certain television, the notification condition may also provide for authorization command to be provided by an SMS response (e.g., "Y," "N," "yes," "no," etc.). Similarly, if an on-screen notification is provided on a first television regarding content attempted to be viewed on a second television, a user of the first television may be able to provide authorization by, for example, using an on-screen menu to input whether to authorize access. Some embodiments may also enable the authorizing user to choose to record the program that is being authorized. This can, for example, allow the authorizing user to view the content and discuss with the viewer later. Additionally or alternatively, embodiments may enable an authorizing user to draft a message (e.g., SMS message, email, etc.) that would appear on the television, enabling the authorizing user to communicate with the viewer. Such functionality can enable the authorizing user to, for example, advise the viewer of some required action or to give some advice or reason for refusal of the authorization. Authorization commands may also include a password, authorization code, or other identifier to help ensure authorization is provided by an authorized individual.

Other controls may also enable notification conditions to be associated with a redirect, in which a television is tuned to (or otherwise displays) a predetermined channel (e.g., a preselected and/or default channel). For example, a parent may create a notification condition in which, if a child's television is tuned to a specified channel (e.g., a channel typically broadcasting content for mature audiences), the incident will be logged, and the television will be tuned to a child-friendly channel. Such redirection may also be utilized with the authorization commands described above, such that, where authorization to access certain content on a television is denied, the television is redirected to a predetermined channel.

Channel redirecting also can be time based for a certain channel. This can be beneficial where parents want to prevent children from viewing certain channels that may broadcast mature content during certain times of the day. For example, a notification condition may include automatic redirection such that, if a first television channel is viewed before 6:00 AM or after 9:00 PM, the television will automatically be redirected to a second channel.

Figure 5:
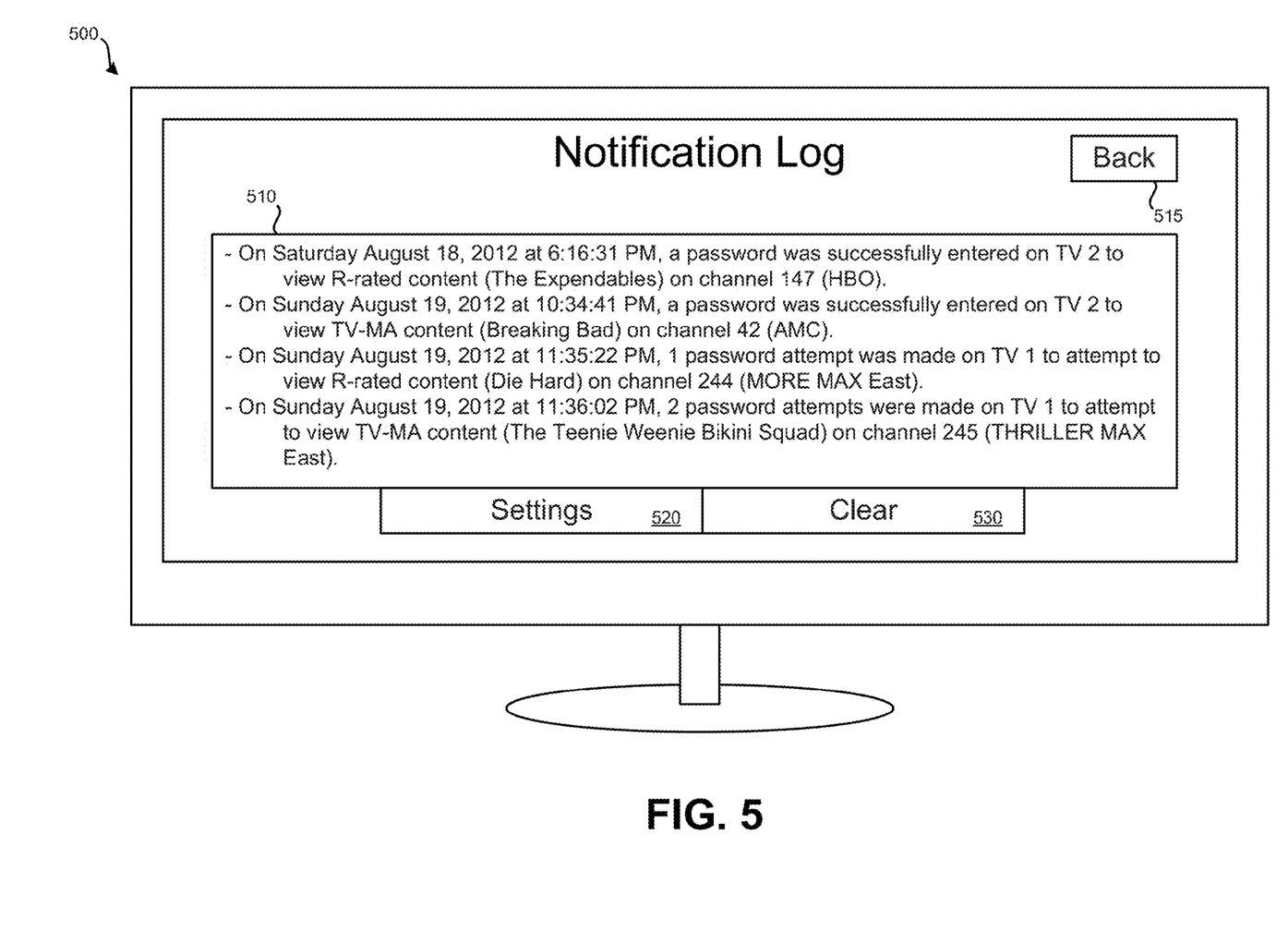
FIG. 5 illustrates a user interface providing a notification log, according to one embodiment.

FIG. 5 illustrates a user interface 500 providing a notification log 510, according to one embodiment. The notification log 510 can include log entries created when certain notification conditions are satisfied. The data provided in the log entries can vary, depending on desired functionality, user settings, and other factors. In the embodiment shown, for example, the data includes the time and date when the log entry was made, as well as a description of why the log entry was made (i.e., how a notification condition was satisfied) and any corresponding content and channels. Such content and channel information can be provided by scheduling data associated with the EPG, for example. Other embodiments may include data entries with more or less data.

Similar to the user interfaces of FIGS. 4A and 4B, the user interface 500 of FIG. 5 may be associated with an EPG, may be accessible require a password to access, view, and/or edit, and may include a back button 515 to allow a user to return to a previous screen. A "Settings" button 520 can allow a user to specify certain settings associated with the notification log, such as password, content of log entries, schedule for clearing and/or archiving log entries, etc. The user interface 500 can also include a "Clear" button 530, by which a user may clear some or all log entries from the notification log 510. Depending on desired functionality, other embodiments may include more or less controls.

Figure 6:
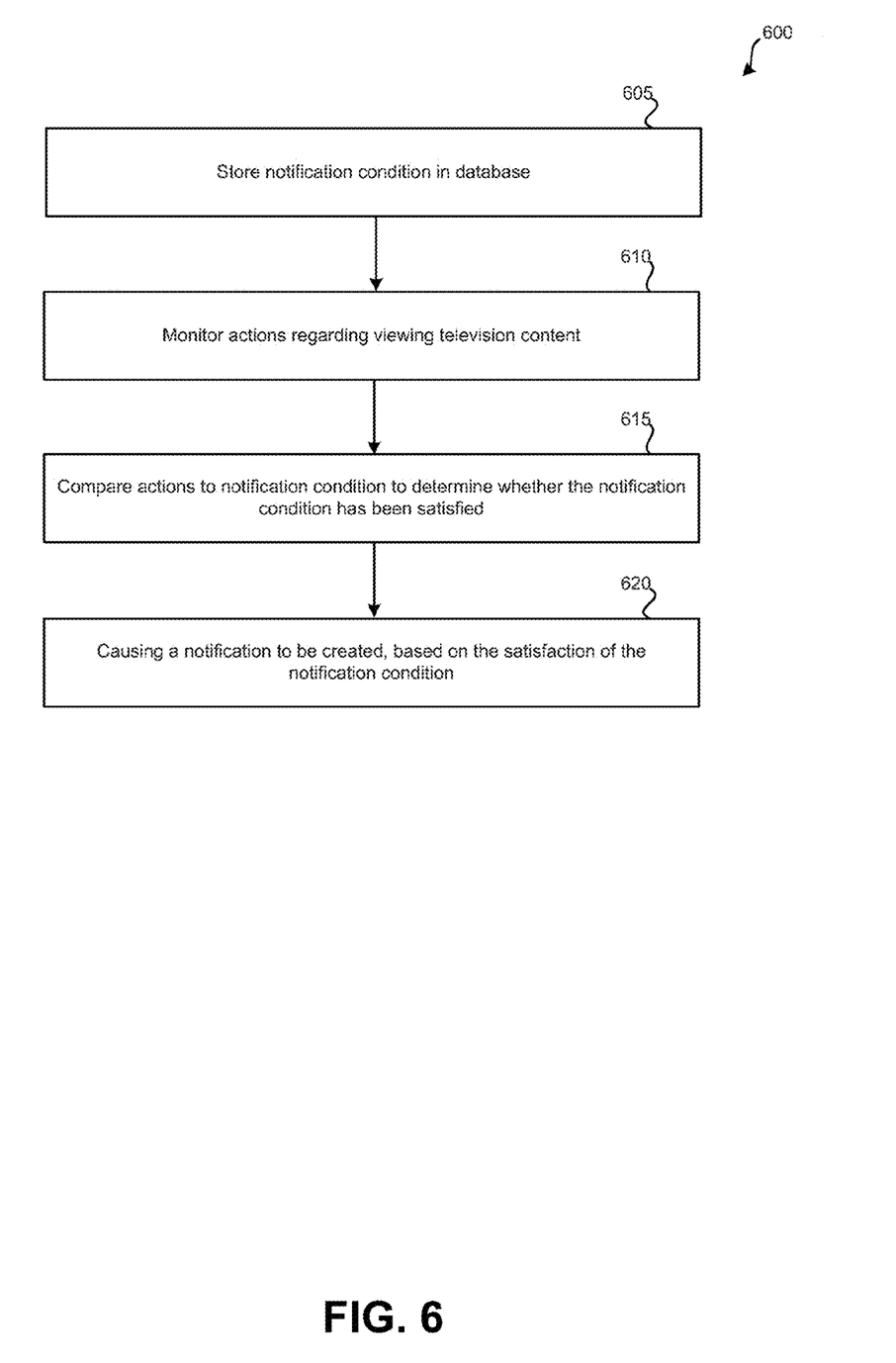
FIG. 6 is a simplified flow diagram of an embodiment of a method for providing notification controls of television viewing.

FIG. 6 is a simplified flow diagram of an embodiment of a method 600 for providing notification controls of television viewing. The method 600 may be performed using a receiver (or other receiving hardware), a television service provider, and/or other components of a notification system, such as the notification system 100 of FIG. 1. Means for performing each step of method 600 can include hardware and/or software components, such as those detailed herein above with regard to FIG. 2, and/or those detailed below in regard to FIG. 6.

At block 605, a notification condition is stored in a database. The notification condition, related to television viewing, can be stored on a memory local to the television (e.g., on a set-top box), or may be stored on a system at a location remote from the television (e.g., a web server). Additionally or alternatively, methods can include simply receiving a notification condition relating to television from user input, a database, etc.

At block 610, actions regarding viewing television content are monitored. Again, the monitoring can be done by a systems local to and/or remote from the television. At block 615, the actions are then compared with the notification condition to determine whether the notification condition has been satisfied. As indicated previously, notification conditions can be based on any of a variety of actions. Such actions can indicate time, duration, content, password entry, and other aspects of television viewing.

At block 620, a notification is created, based on the satisfaction of the notification condition. Notifications can include email, SMS messages, on-screen television notifications, log entries, and the like. Components of a notification system (e.g., receiving hardware, web server, etc.) can create the notification itself, and/or simply provide data to other systems (e.g., SMS messaging server, email server, etc.) for creation and/or delivery of the notification.

It should be appreciated that the specific steps illustrated in FIG. 6 provide an example method for providing notification controls of television viewing. Alternative embodiments may include alterations to the embodiments shown. Furthermore, additional features may be added or removed depending on the particular applications. For example, embodiments may include creating and/or receiving the notification condition based on user input. Additionally or alternatively, embodiments may include providing the notification to the user. One of ordinary skill in the art would recognize many variations, modifications, and alternatives.

Figure 7:
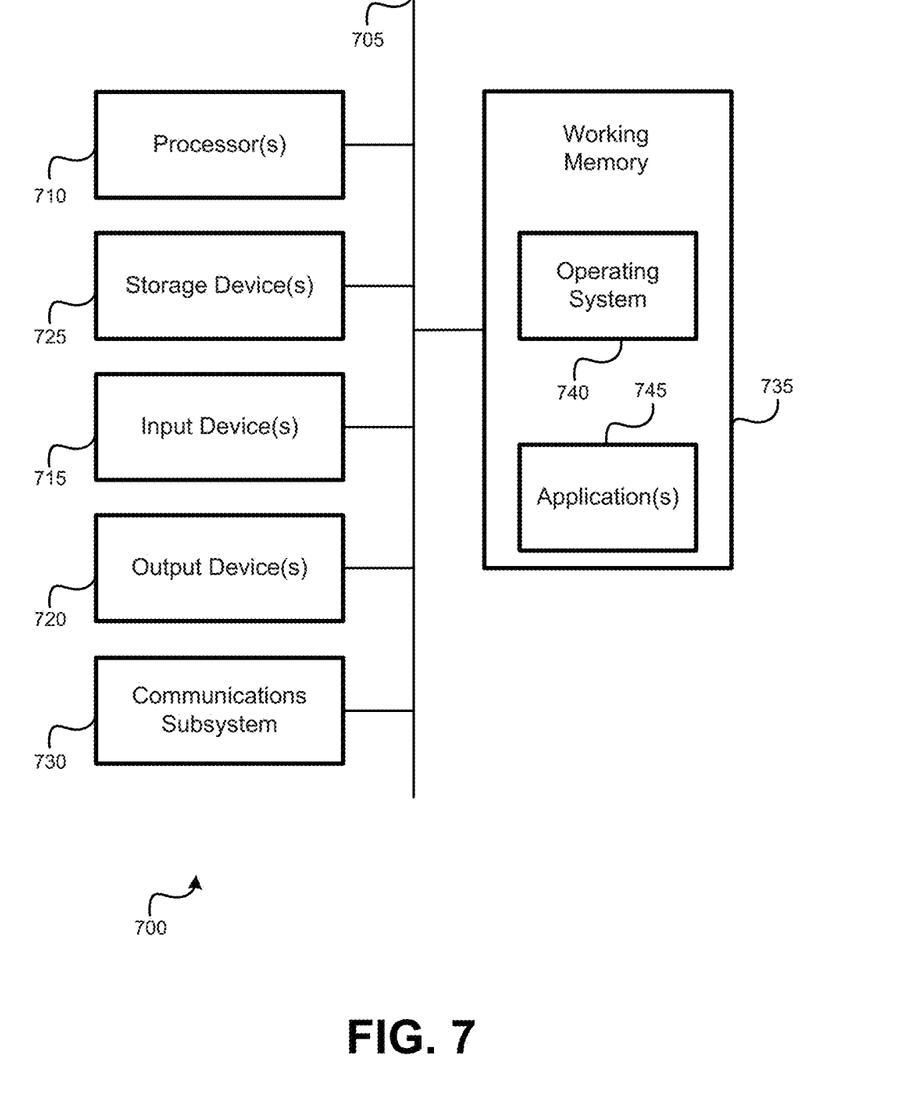
FIG. 7 illustrates an embodiment of a computer system.

FIG. 7 illustrates an embodiment of a computer system. A computer system as illustrated in FIG. 7 may be incorporated as part of the previously-described computerized devices, such as receiving equipment 200 of FIG. 2, receiver 150 of FIG. 1, television service provider 110 of FIG. 1, and/or other devices (e.g., mobile device 195 and computing device 185 of FIG. 1). For example, computer system 700 can represent some of the component of local and/or remote computer systems discussed in this application.

FIG. 7 provides a schematic illustration of one embodiment of a computer system 700 that can perform the methods provided by various other embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit with one or more processors 710, including without limitation one or more general-purpose processors and/or one or more special-purpose processors (such as digital signal processing chips, graphics acceleration processors, and/or the like); one or more input devices 715, which can include without limitation a remote control, a mouse, a keyboard, and/or the like; and one or more output devices 720, which can include without limitation a display device (e.g., television), a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, and/or system components (such as those described in relation to FIG. 2) might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might stored on a non-transitory computer-readable storage medium, such as the storage devices) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A method for providing notification controls of video content, the method comprising:
    creating a notification condition based on user input, the notification condition relating to viewing of video content at a location having a plurality of presentation devices, wherein the notification condition identifies a first subset of the presentation devices at the location to which the notification condition applies, and wherein the notification condition does not apply to a second subset of the presentation devices at the location;
    storing the notification condition in a database;
    monitoring attempts to view video content on the first subset of presentation devices;
    comparing, with a processing unit, the attempts to view video content on the first subset of presentation actions with the notification condition to determine whether the notification condition has been satisfied; and
    in response to determining that one or more of the attempts to view particular video content on the first subset of presentation devices has satisfied the notification condition:
        (a) determining a device associated with an authorizing user;
        (b) causing a notification to be transmitted to the device associated with the authorizing user, based on satisfaction of the notification condition at one or more presentation devices within the first subset of presentation devices; and
        (c) initiating recording of the particular video content corresponding to the one or more of the viewing attempts that satisfied the notification condition.

2. The method for providing notification controls of video content of claim 1, wherein further comprising causing the at least one presentation device to be redirected to a certain television channel, based on the satisfaction of the notification condition.

3. The method for providing notification controls of video content of claim 1, wherein the satisfaction of the notification condition is based on
    entry of a threshold number of incorrect password attempts at one or more of the first subset of presentation devices.

4. The method for providing notification controls of video content of claim 1, further comprising:
    receiving, in response to the notification, an authorization command from the device associated with the authorizing user, the authorization command including a command by the authorizing user to allow the particular video content to be viewed on the one or more presentation devices; and
    allowing the particular video content to be viewed, based on the authorization command.

5. The method for providing notification controls of video content of claim 1, further comprising providing a user interface for creation of the notification condition, wherein the user interface comprises at least one of:
- an interface displayed on the at least one of the first subset of presentation devices,
- a web page, or
- an application executed by a computing device.

6. The method for providing notification controls of video content of claim 1, wherein the database is stored on a computer-readable storage medium at a location remote from the first subset of presentation devices.

7. An apparatus for providing notification controls of video content, the apparatus comprising:
- at least one television tuner configured to receive at least one channel of television programming;
- a communication interface configured to communicate data via a communication network;
- a processing unit communicatively coupled with the at least one television tuner and the communication interface; and
- a memory communicatively coupled with and readable by the processing unit and having stored therein computer-readable instructions which, when executed by the processing unit, cause the processing unit to:
  - receive a notification condition relating to viewing of video content at a location having a plurality of presentation devices, wherein the notification condition identifies a first subset of the presentation devices at the location to which the notification condition applies, and wherein the notification condition does not apply to a second subset of the presentation devices at the location;
  - monitor attempts to view television content on the first subset of the presentation devices;
  - compare the attempts to view video content on the first subset of presentation devices with the notification condition to determine whether the notification condition has been satisfied;
  - in response to determining that one or more of the attempts to view particular video content on the first subset of presentation devices has satisfied the notification condition:
    - (a) determine a device associated with an authorizing user;
    - (b) cause a notification to be transmitted to the device associated with the authorizing user, based on satisfaction of the notification condition at one or more presentation devices within the first subset of presentation devices; and
    - (c) initiate recording of the particular video content corresponding to the one or more of the viewing attempts that satisfied the notification condition.

8. The apparatus for providing notification controls of video content of claim 7, wherein the satisfaction of the notification condition is based on
- entry of a threshold number of incorrect password attempts at one or more of the first subset of presentation devices.

9. The apparatus for providing notification controls of video content of claim 7, wherein the computer-readable instructions, when executed by the processing unit, further cause the processing unit to tune the at least one television tuner to a certain television channel, based on the satisfaction of the notification condition.

10. The apparatus for providing notification controls of video content of claim 7, wherein the computer-readable instructions, when executed by the processing unit, further cause the processing unit to:
- receive, from the device associated with the authorizing user and in response to the notification, an authorization command, the authorization command including a command by the authorizing user to allow the particular video content to be viewed on the one or more presentation devices; and
- allow the particular video content to be viewed, based on the authorization command.

11. A computer program product residing on a non-transitory machine-readable storage medium for providing notification controls of video content, the computer program product comprising processor-readable instructions configured to cause a processing unit to:
- receive a notification condition relating to viewing of video content at a location having a plurality of presentation devices, wherein the notification condition identifies a first subset of the presentation devices at the location to which the notification condition applies, and wherein the notification condition does not apply to a second subset of the presentation devices at the location;
- monitor attempts to view video content on the first subset of the presentation devices;
- compare the attempts to view video content on the first subset of presentation devices with the notification condition to determine whether the notification condition has been satisfied;
- in response to determining that one or more of the attempts to view particular video content on the first subset of presentation devices has satisfied the notification condition:
  - (a) determine a device associated with an authorizing user;
  - (b) cause a notification to be transmitted to the device associated with the authorizing user, based on satisfaction of the notification condition at one or more presentation devices within the first subset of presentation devices; and
  - (c) initiate recording of the particular video content corresponding to the one or more of the viewing attempts that satisfied the notification condition.

12. The computer program product for providing notification controls of video content recited in claim 11, wherein the processor-readable instructions are further configured to cause the processing unit to redirect the at least one presentation device to a certain television channel, based on the satisfaction of the notification condition.

13. The computer program product for providing notification controls of video content recited in claim 11, wherein the processor-readable instructions are further configured to cause the processing unit to:
- receive, from the device associated with the authorizing user and in response to the notification, an authorization command, the authorization command including a command by the authorizing user to allow the particular video content to be viewed on the one or more presentation devices; and
- allow the particular video content to be viewed, based on the authorization command.

14. The method for providing notification controls of video content of claim 1, wherein the satisfaction of the notification condition is based on entry of a correct password used to access the particular video content on one or more of the first subset of presentation devices.

15. The method for providing notification controls of video content of claim 1, wherein the satisfaction of the notification condition is based on a determination that at least one attempt to view the particular video content has been performed on multiple presentation devices within the first subset of presentation devices.

16. The method for providing notification controls of video content of claim 1, wherein the satisfaction of the notification condition is based on a determination that an attempt to view the particular video content has been performed on one or more of the first subset of presentation devices, during a certain identified time period associated.

17. The method for providing notification controls of video content of claim 1, wherein the satisfaction of the notification condition is based on viewing of a threshold amount of the particular video content on one or more of the first subset of presentation devices, during a predetermined amount of time.

18. The method for providing notification controls of video content of claim 1, wherein the satisfaction of the notification condition is based on a determination that the particular video content was searched for using one of the first subset of presentation devices.

19. The method for providing notification controls of video content of claim 1, further comprising:

receiving, in response to the notification, an authorization command from the device associated with the authorizing user, the authorization command including a command by the authorizing user denying access for the particular video content to be viewed on the one or more presentation devices; and in response to receiving the authorization command, causing the one or more presentation devices at which the notification condition was satisfied to be redirected to a particular television channel.

20. The method for providing notification controls of video content of claim 1, further comprising:

receiving, in response to the notification, an authorization command from the device associated with the authorizing user, the authorization command including a command by the authorizing user allowing or denying access for the particular video content to be viewed on the one or more presentation devices, the authorization command further including a customized message from the authorizing user; and in response to receiving the authorization command, displaying the customized message from the authorizing user on the one or more presentation devices at which the notification condition was satisfied.

* * * * *